United States Patent Office 2,891,087
Patented June 16, 1959

2,891,087

BIXIN AND NOR-BIXIN ESTERS

Sidney F. Schaeren, Mystic, and Walter T. Moreland, New London, Conn., assignors to Chas. Pfizer & Co., Inc., Brooklyn, N.Y., a corporation of Delaware No Drawing. Application July 25, 1955
Serial No. 524,266

5 Claims. (Cl. 260—463)

This invention is concerned with novel food coloring compounds and with certain compositions containing said compounds. More particularly this invention is concerned with a new group of esters of the pigments bixin and nor-bixin.

Bixin is a carotenoid pigment which occurs in the husks of the annatto seed. The annatto tree (*Bixa orellana*) which produces this seed is indigeneous to Central America. Bixin is the mono-methyl ester of the carotenoid di-carboxylic acid nor-bixin. Its structure is represented below.

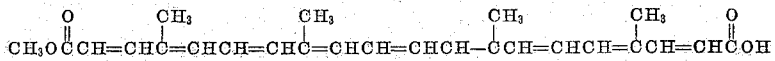

This and the other carotenoid pigments are reviewed in a recent text entitled "Carotenoids" by Paul Karrer and Ernest Jucker, Elsevier Publishing Company, Inc., New York, 1950.

The valuable esters of this invention are represented by the following structural formulae

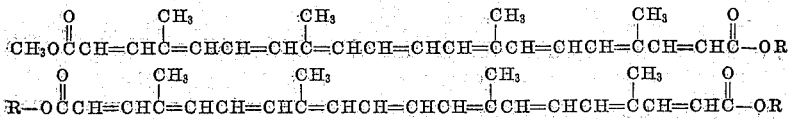

wherein R is an etherified or esterified hydroxyalkyl or polyhydroxyalkyl group such as that corresponding to glycerol, ethylene glycol, propylene glycol, or polyvinyl alcohol after the removal of one —OH group. The ether groups in the above R group may be alkyl, aryl or aralkyl groups. Similarly the ester groups in this R group may be derived from aliphatic, aromatic or araliphatic acids. All or just a portion of the free hydroxyl groups may be so etherified or esterified. The bixin and nor-bixin esters of such etherified or esterified polyhydroxy compounds are useful as coloring agents for high fat content foods such as oleomargarine and butter because of the color imparted by the bixin or nor-bixin portion of the molecule and the fat solubility imparted by the esterifying R group. Especially desirable properties for this use are found in the new and novel compounds of this invention wherein the ether and ester functions of the R group comprise long alkyl chains such as in the mono and diglycerides derived from various natural fats and oils.

Numerous materials have been used in the past for food coloring pigments but these materials each suffer from certain disadvantages. A number of the so-called coal tar dyes and other synthetic dyes have been used, but many of them are considered to be toxic or to lead to toxic decomposition products during the cooking process. Some natural pigments have been employed including β-carotene and, indeed, crude bixin containing extracts of the annatto seed. The natural materials particularly the latter, suffer from lack of stability, nonuniformity, and high cost, per unit of color.

Bixin itself is not useful for coloring foods of high fat content such as butter and oleomargarine because it is oil insoluble. The alkyl esters of bixin and the dialkyl esters of nor-bixin suffer from a similar lack of solubility. Furthermore, these materials are difficult to prepare on a large scale.

Bixin, and nor-bixin, do not yield to normal methods of esterification such as treatment with an alcohol in the presence of an acid catalyst and transesterification with a higher alcohol in the presence of a strong base. A few esters have been prepared by the treatment of bixin and nor-bixin salts with alkyl halides or sulfates, but this method is not convenient for large scale use due to the insoluble nature of the intermediate salts.

It has now been found that bixin can be readily esterified with various hydroxylated organic compounds by means of its alkyl carbonic mixed anhydrides. Ordinarily the bixin-alkylcarbonic anhydrides react very sluggishly with alcohols and more complicated hydroxylated organic compounds. However, if a tertiary amine such as triethylamine or pyridine is used as a catalyst in this esterification step the reaction proceeds at a satisfactory rate and can be completed under sufficiently mild conditions to permit the formation of these esters without extensive decomposition. The mechanism by which tertiary amines catalyze this reaction is not known. It is preferred to use relatively low boiling amines, i.e. those boiling below about 120° C., that can be readily removed at the end of the reaction by vacuum evaporation.

Mixed carbonic anhydrides of this sort have been used in the past for esterification purposes, but in general, they are unstable and can only be kept at reduced temperatures in anhydrous media and then frequently only for short periods of time. By and large, such mixed anhydrides must be prepared and used immediately. Bixin-alkyl carbonic mixed anhydrides on the other hand are unique among anhydrides of this type in that they are stable compounds, some even at their melting points. By the use of such mixed anhydrides, it has been possible to prepare a variety of esters of bixin. Similarly, by use of the dicarboxylic acid nor-bixin in this process a bis-anhydride was obtained in which both of the free carboxyl groups of nor-bixin were present as alkyl carbonic anhydrides. Esters were then prepared from this material in an analogous fashion. While such esters have desirable properties for the present use, their preparation is not adaptable to large scale operation due to the insoluble nature of nor-bixin and its salts.

The useful and surprisingly stable alkyl carbonic mixed anhydride intermediates of this invention may be represented by the following structural formulae

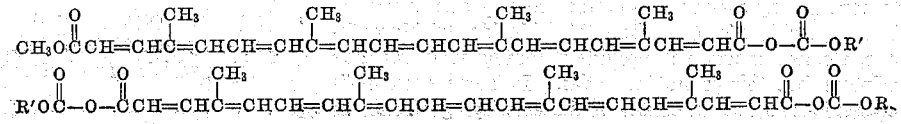

wherein R' is a lower straight or branched chain alkyl group such as methyl, ethyl, n-propyl, iso-propyl, n-butyl, sec-butyl, iso-butyl, hexyl, or 2-ethylhexyl. Thus by lower alkyl group is meant straight or branched chain alkyl groups having up to about eight carbon atoms.

These valuable mixed anhydrides are readily prepared by the treatment of a trialkylamine salt of bixin or nor-bixin in a suitable solvent with an alkyl haloformate. Suitable solvents are those in which the bixin or nor-bixin trialkylamine salts are soluble and which do not react with the resulting mixed anhydride. Examples include the lower aliphatic ketones, such as acetone and methyl ethyl ketone, and the lower chlorinated aliphatic hydrocarbons such as chloroform, trichloroethane, and trichloroethylene. Useful trialkylamine salts include those of trimethylamine, triethylamine, dimethyl ethylamine, dimethylpropylamine, diethylpropylamine, benzyl-dimethylamine, etc. As is indicated by the structures in the preceding paragraph, useful alkyl haloformates include those whose alkyl groups have up to about eight carbon atoms. Either the bromoformates or chloroformates may be used, but the iodoformates and fluoroformates are not generally suitable. By haloformate, then, is meant either the bromo or chloro compound. The preparation is customarily carried out by dissolving the bixin or nor-bixin and the trialkylamine in chloroform and cooling the mixture to less than about 10° C. The alkyl haloformate is then added to this mixture with stirring and continued cooling. Stoichiometric quantities of reactants may be used, but it is preferred to use an excess of up to about 20% of trialkylamine and 50% of alkyl haloformate. The materials are permitted to react for a period of about an hour at this temperature and completion of the reaction is then ensured by stirring the mixture at room temperature, i.e. 20–35° C., for an additional period of about an hour. The purpose of customarily carrying out the initial phase of the reaction at a reduced temperature is to prevent decomposition of the mixed anhydride. However, the bixin-alkyl carbonic mixed anhydrides of this invention have in fact been found to be stable materials, therefore carrying out the initial phase of the reaction at reduced temperature is not a critical feature of the process. The stability of these mixed anhydrides is illustrated by the methyl, ethyl and isobutyl compounds which are stable up to their melting points of 150° C., 143° C. and 130° C. respectively.

The second step of the valuable process of this invention, that is the esterification step, is carried out by treating a mixed anhydride as described above with either a simple mono or polyhydric alcohol such as the aliphatic or alicyclic alcohols ethanol, butanol, decanol, cyclohexanol, ethylene glycol, propylene glycol, glycerol or polyvinyl alcohol, in the presence of a tertiary amine. Again at least about stoichiometric proportions of alcohol and mixed anhydride are employed. However, in some cases, particularly where the alcohol can conveniently serve as a solvent, large excesses may be used. While the so-obtained esters of the simple alcohols have a somewhat improved fat solubility, as indicated above, over bixin nor-bixin and are also useful as intermediates in organic synthesis, the highly valuable fat soluble food coloring products of this invention are obtained by esterifying bixin or nor-bixin with a partially etherified or esterified polyhydric alcohol via the above mixed anhydride intermediate. By partially etherified or esterified polyhydric alcohol is meant an alcohol of the sort indicated above, which contains at least one free hydroxyl group and all or a portion of the remaining hydroxyl groups are etherified or esterified. It is generally desirable to use an inert organic solvent such as the aromatic hydrocarbons e.g. benzene, toluene and xylene, or the chlorinated aliphatic hydrocarbons e.g. chloroform, carbon tetrachloride, trichloroethane, etc. as a medium to provide a homogeneous reaction mixture but this is not essential. In some cases it is convenient to use an excess of the esterifying alcohol as the solvent. The reaction can be carried out either at room temperature or at any elevated temperature say up to about the boiling point of the solvent. In selecting a reaction temperature, the stability of the reactants must be considered. In general, it has been found desirable to operate at temperatures less than about 100° C. It is advisable to adjust the above variables to the particular example at hand in order to find the optimum conditions for the reaction at hand.

In a preferred embodiment of this invention, monobixin esters of the mono and diglycerides derived from the partial hydrolysis of cottonseed oil have been prepared. The exact structure of the resulting glycerides is not known. This is due to the fact that the starting mono and diglycerides that have been used were commercial products that were not entirely homogeneous nor of definite structure. Furthermore, in the esterification of an α-monoglyceride, it is not known whether the introduction of one acyl group yields an alpha, alpha-prime diglyceride or an alpha, beta diglyceride. However, these points regarding structure are of minor importance with regard to the properties of the resulting products. The important feature of these di and triglycerides containing one bixin or nor-bixin substituent is that they possess superior properties with regard to color potency, stability and fat blendability.

For the preparation of a bixin monoglyceride ester, the bixin-carbonic mixed anhydride is allowed to react with the mono or diglyceride either in an inert solvent or in an excess of the glyceride as a solvent. It is not necessary to isolate and purify the so produced bixin containing glyceride. Rather it is preferred to simply remove the volatile components of the mixture, i.e., carbon dioxide and the alcohol corresponding to the carbonic ester employed, at the conclusion of the reaction period, and to dilute the so-obtained concentrate to the desired color potency with a suitable solvent such as a vegetable oil. Stable, uniform, and reproducible preparations are obtained in this fashion.

It is important in carrying out this preferred embodiment to select a monoglyceride which is substantially free of water and glycerol. Both of these materials react with the bixin-carbonic anhydride under the reaction conditions employed to give by-products of lower fat solubility. Any water present, of course, yields an equivalent amount of the fat insoluble bixin and the glycerol yields a dibixinate which crystallize out of solutions of the bixin glyceride ester concentrates if it is present in high concentration.

In one specific embodiment of this invention, the bixin-ethyl carbonic anhydride was dissolved in benzene along with approximately one molar proportion of a monoglyceride preparation rich in glycerol monooleate. A small amount of triethylamine was added to the solution as a catalyst and the reaction mixture was refluxed for two hours. At the conclusion of the reflux period the mixture was diluted with a further quantity of monoglyceride and refluxed for an additional thirty minutes in order to assure consumption of all of the anhydride charged. The mixture was cooled, diluted with either monoglyceride or vegetable oil to the desired concentration and the benzene and other volatile constituents removed on a water bath at 30° under reduced pressure. The resulting concentrate was then filtered to free it of a small amount of insoluble material and found suitable as a food color in this form.

In some cases, the stability and uniformity of the product was improved by diluting the mono and diglyceride concentrates prepared in this fashion with a vegetable oil such as cottonseed oil, peanut oil or corn oil to a predetermined color potency. A particularly desirable product was found to consist of a concentrate prepared in this fashion which was diluted to an $E_{1cm}^{1\%}$ value at 470 mμ of 150 with vegetable oil and in which the solvent oil contained about 30% glycerol monooleate.

The instant bixin monoglyceride esters are particularly useful for the purpose outlined above. Of the common monoglycerides, glycerol monooleate is especially useful for the preparation of a color concentrate for use in the coloring of butter and oleomargarine since it is a liquid. In addition, it is an excellent solubilizer, diluent, and emulsifier. Thus, a concentrate of a bixin-oleic acid diglyceride in glycerol monooleate or a mixture of glycerol monooleate and a vegetable oil has been found to combine the useful properties listed above with the desirable pigmentation properties of bixin in a fat soluble form.

The following examples are given to further illustrate this valuable invention. However, it is to be understood that they are not intended to limit the invention in any way. The invention is limited only by the specific wording of the appended claims.

Example I

To a solution of 39.5 g. of bixin (0.10 mole) in 500 ml. of dry chloroform was added 16.4 ml. of triethylamine (0.118 mole) and the reaction mixture stirred at room temperature for one hour. The resulting dark red solution was cooled to −7° C. and a solution of 13.1 ml. of ethyl chloroformate (0.137 mole) in 30 ml. of dry chloroform was added over a period of 10 minutes. Stirring was continued for 30 minutes at −9° C. and for 60 minutes at room temperature. The reaction mixture was transferred to a separatory funnel and washed four times with 50 ml. portions of ice water. The chloroform solution was dried over anhydrous sodium sulfate and the solvent removed by distillation under reduced pressure (water aspirator). The crude residue was dried under an oil pump vacuum (0.2 mm.) for four hours to yield the solid mixed anhydride, 41.0 g. (88%), M.P. 142–143°; max.=482 mμ.

$$E_{1\,cm.}^{1\%} = 2505 \text{ (chloroform)}$$

*Analysis.*—Calcd. for $C_{28}H_{34}O_6$: C, 72.08; H, 7.35; ash, none. Found: C, 69.47; A, 7.11; ash, 4.08. Recalculated taking the weight of the ash into consideration; found: C, 72.42; H, 7.41.

In some runs, material melting at 140–142° was obtained. This material was found to be of adequate quality for esterification purposes.

Example II

To a solution of 19.7 g. of bixin (0.050 mole) in 350 ml. of dry chloroform was added 5.93 g. of triethylamine (0.059 mole) and the reaction mixture stirred at room temperature for one hour. The dark red solution then was cooled to −7° C. and a solution of 6.52 g. of methyl chloroformate (0.065 mole) in 20 ml. of dry chloroform added over a period of 10 minutes. After the addition was completed, stirring was continued for 30 minutes at −9° C. and 60 minutes at room temperature. The reaction mixture was transferred to a separatory funnel and washed four times with 50 ml. portions of ice water. The chloroform solution was dried over 3 g. of anhydrous sodium sulfate and the chloroform thus removed by distillation under reduced pressure (water aspirator). The crude residue was dried under an oil pump vacuum (0.2 mm.) for four hours; 19.6 g. (87%), M.P. 141–142° C.; max.=483 mμ

$$E_{1\,cm.}^{1\%} = 2480 \text{ (chloroform)}$$

A sample was prepared for analysis by recrystallization from benzene-hexane. It melted at 149.5–150.5° C.

*Analysis.*—Calcd. for $C_{27}H_{32}O_6$: C, 71.66; H, 7.14. Found: C, 71.40; H, 7.04.

Example III

A solution of 2.33 g. of bixin ethylcarbonic mixed anhydride (0.005 mole) from Example I in a mixture of 100 ml. of pyridine and 50 ml. of ethyl alcohol was allowed to stand at room temperature for two days. The pyridine and the excess ethyl alcohol were then evaporated under reduced pressure and the resulting residue dissolved in 100 ml. of chloroform. The chloroform solution was washed with water, dried over anhydrous sodium sulfate and the chloroform evaporated on a steam bath. The crude residue was dissolved in 100 ml. of acetone and the solution filtered in order to remove traces of acetone insoluble material. The filtrate was evaporated under reduced pressure and the residue dissolved in the minimum amount of boiling ethyl alcohol from which the product crystallized on cooling; weight, 1.1 g., M.P. 140–142°. A mixed melting point with an authentic sample of ethyl bixin showed no depression.

Example IV

Dry triethylamine, 2 g., was added to a solution of 23.3 grams (0.05 mole) of bixin-ethyl carbonic anhydride from Example I and 20 g. (ca. 0.05 mole) of commercial glycerol monooleate (Myverol 18–85 of Distillation Products, Inc.) in 100 ml. of dry benzene. The monooleate product employed, Myverol 18–85, contains approximately 90% monoglycerides, has an average molecular weight of 348, and a maximum glycerol content of 1.5%. The reaction mixture was refluxed for two hours and then 50 g. of a dry mixed glycerol monooleate-diolate product (Glyco S. 1096 of Glyco Products Co., Inc., Brooklyn, New York), previously dried by azeotropic distillation with benzene, was added and the refluxing continued for 30 minutes. Use of the mixed monooleate-diolate product at this stage gives a more soluble product. The mixture was allowed to cool to room temperature and diluted with an additional 150 g. of dry Glyco S. 1096. The benzene and triethylamine were then removed in vacuo on a water bath of 30°. In order to remove the last traces of these materials it was necessary to pass a stream of nitrogen through the liquid in the evacuated flask. The degassed concentrate was then filtered to remove a small amount of solid material. The so-obtained concentrate had an $$E_{1\,cm.}^{1\%}$$

value of 187 at 470 mμ when diluted with chloroform.

Example V

In order to test the stability of the bixin-oleic acid diglyceride concentrate prepared in Example IV, samples of it were diluted with cottonseed oil from an $$E_{1\,cm.}^{1\%}$$

value at 470 mμ of approximately 150 to a value of 100. These samples were allowed to stand at room temperature (24–27° C.) in diffuse light. After one month the $$E_{1\,cm.}^{1\%}$$

values of these samples had decreased by only 3 to 5% indicating a highly satisfactory pigment stability.

What is claimed is:

1. A compound having the structure

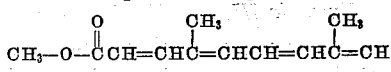

wherein R' is a lower alkyl group.

2. A compound having the structure

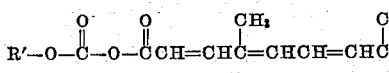

wherein R' is a lower alkyl group.

3. A process for preparing an alkyl carbonic mixed anhydride which comprises treating a compound selected from the group consisting of a trialkylamine salt of bixin and bis-trialkylamine salt of nor-bixin with an alkyl haloformate in an inert organic solvent.

4. A process for preparing esters of bixin and nor-bixin which comprises treating an alkyl carbonic mixed anhydride with a compound selected from the group consisting of monoglycerides, di-glycerides and alkanols in the presence of a tertiary amine.

5. A process for preparing esters of bixin and nor-bixin which comprises preparing an alkyl carbonic mixed anhydride by treating a compound selected from the group consisting of a trialkylamine salt of bixin and bis-trialkylamine salt of nor-bixin with an alkyl haloformate in an inert organic solvent and then treating the so-produced alkyl carbonic mixed anhydride with a compound selected from the group consisting of monoglycerides, di-glycerides, and alkanols in the presence of a tertiary amine.

References Cited in the file of this patent

UNITED STATES PATENTS

| | | |
|---|---|---|
| 2,523,309 | Kester | Sept. 26, 1950 |
| 2,768,198 | Marbet et al. | Oct. 23, 1956 |
| 2,830,908 | Perret | Apr. 15, 1958 |

FOREIGN PATENTS

| | | |
|---|---|---|
| 238,105 | Germany | Sept. 18, 1911 |

OTHER REFERENCES

Hassett: Chem. Abst. 3 (1909), 2706.
Van Duuren: Chem. Abst. 33 (1939), 5080.
Karrer: "Organic Chemistry" (1950), 4th ed., p. 713.